United States Patent [19]

Watts

[11] 4,278,550

[45] Jul. 14, 1981

[54] FLUID SEPARATOR

[76] Inventor: John D. Watts, P.O. Box 79466, Houston, Tex. 77079

[21] Appl. No.: 103,693

[22] Filed: Dec. 14, 1979

[51] Int. Cl.³ .................. B04C 1/00; B04C 11/00
[52] U.S. Cl. ..................... 210/741; 55/17;
    55/21; 55/450; 210/788; 210/104; 210/512.1
[58] Field of Search ............... 210/512 M, 84, 512 R,
    210/104, 128, 741, 788; 55/17, 21, 177, 396,
    448, 450, 461

[56] References Cited

U.S. PATENT DOCUMENTS

| 361,232 | 4/1887 | Ortman | 55/396 |
|---|---|---|---|
| 940,885 | 11/1909 | Mazza | 55/17 |
| 1,701,942 | 2/1929 | Andrews | 210/512 R |
| 1,831,473 | 11/1931 | Adams | 210/512 R |
| 2,768,745 | 10/1956 | Albertson | 209/211 |
| 3,370,407 | 2/1968 | Morawski | 210/512 R |
| 3,399,770 | 9/1968 | Salomon | 209/211 |
| 3,766,720 | 10/1973 | Bloom | 55/461 |
| 3,891,546 | 6/1975 | Humphreys | 209/211 |
| 4,179,273 | 12/1979 | Montusi | 210/512 R |

OTHER PUBLICATIONS

Separators and Scrubbers A BS&B Homco bulletin 3366-420M, no date.

Primary Examiner—John Adee

[57] ABSTRACT

A continuous separator for a pressurized mixture of fluids of different densities based on a progressively increasing centrifugal force acting on the mixture to successively separate fluids in the order of their densities beginning with the densest fluid. A wide range of fluid volumns and fluid mixes can be efficiently and economically separated.

12 Claims, 4 Drawing Figures

U.S. Patent     Jul. 14, 1981     4,278,550
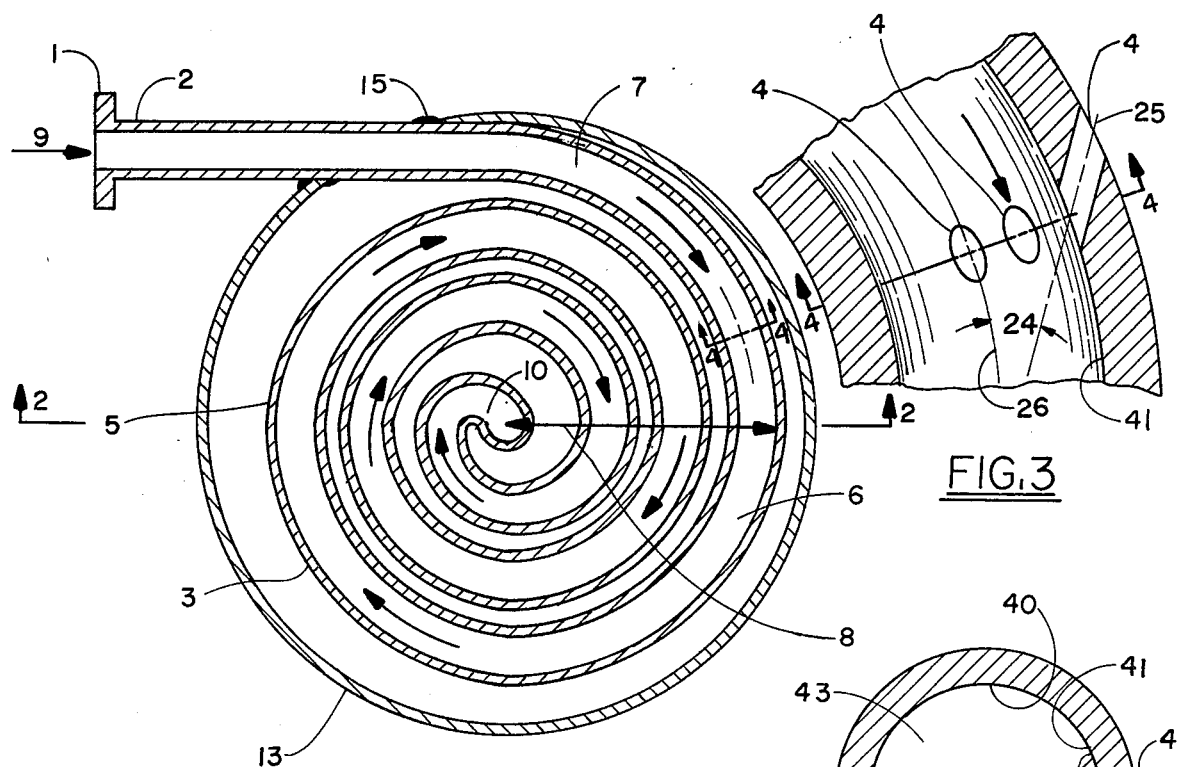
FIG. 1
FIG. 3
FIG. 4
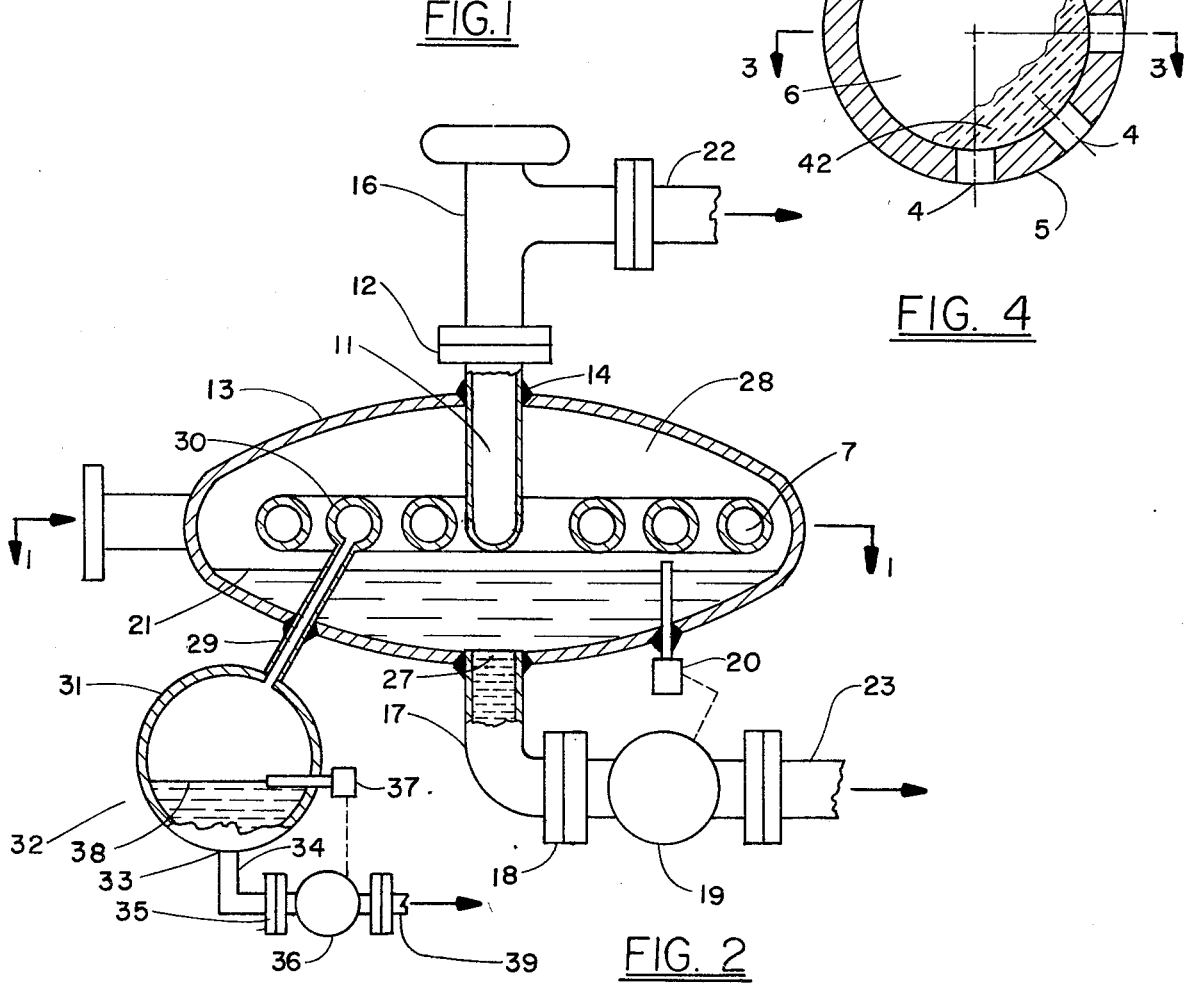
FIG. 2

FLUID SEPARATOR

BACKGROUND OF THE INVENTION

The separation of fluids of different densities by centrifugal force has been practiced for many years and in many industries, however, the practice has not included a progressively increasing centrifugal force on the path of the lightest fluid in a continuous separation process.

The inside back cover of BS and B Homco Booklet No. 3366-420M, entitled "Separators and Scrubbers", depicts a conventional arrangement widely used for separation of fluids from oil and gas wells. Attesting that only part of the desired separation occurs in the centrifuge section, a mist extractor and coalescence plates are used downstream of the centrifuge to separate out finer particles than the "one turn" centrifuge is capable of. Also, the relative size of the entire separator to the centrifuge indicates considerable room for improvement of centrifuge efficiency.

Prior art (U.S. Pat. No. 1,701,942) disclosed a helical path of: constant diameter; constant flow area; and therefore no increase of centrifugal force.

Prior art (U.S. Pat. No. 1,831,473) provides for upward axial flow of the light fluid while vanes 60, rotate to force heavier fluids outwardly to be trapped under spiral track 62 and then urged downwardly by the spiral track. However, since all vanes rotate at one speed, no increase in centrifugal force is produced in the path of the lighter fluid.

Prior art (U.S. Pat. No. 2,768,745) and Prior art (U.S. Pat. No. 3,399,770) show the generally typical configuration of a "cyclone" separator each having: a tangential inlet; a centrally disposed upper outlet for lighter fluid; and a lower hopper to guide heavy silts or the like to the lower outlet. No centrifugal force at all is produced in the path of the lighter fluid.

Prior art (U.S. Pat. No. 3,891,546) deals with gravitational flow along a helix of constant radius.

Although the prior art discloses a tangential entry of the mixture and a central exit of the lighter fluid, the light fluid is free to immediately exit, short of proper separation and no effort is made to cause and control an increase of centrifugal force in the path of the lighter fluid which is necessary to practice my invention.

SUMMARY OF THE INVENTION

The instant invention comprises a continuous method and means to receive a wide range of mixtures of pressurized fluids having different densities and to separate those fluids by causing a progressively increasing centrifugal force to act on the path of the lightest fluid. Fluids of different densities are removed through separate conduits. A low beginning centrifugal force limits beginning separation so as not to block the separation conduit with separated heavy fluid; a progressively increasing centrifugal force gradually separates progressively lighter particles from the remaining mixture, continuing to the degree of separation desired.

Some objects of my invention are to:

1. Provide a more efficient method and apparatus to separate two or more fluids of different densities.

2. Provide an effective separator for a relatively wide range of flow rates.

3. Reduce the size, weight and cost of a separator to handle a given flow rate of a mixture.

4. Provide safe and effective separation even for surging and slugging flows of mixture as often occurs from petroleum wells.

5. Provide safe and effective separation at high pressure.

6. Provide a self cleaning action for the separation surfaces.

7. Help reduce air pollution by producing cleaner discharges as in the case of dust collectors.

8. Save energy by reducing the manufacture, fabrication and transportation of materials used in the separator construction and installation.

BRIEF DESCRIPTION OF THE DRAWINGS

FIG. 1 is a horizontal section of the preferred embodiment taken along line 1—1 of FIG. 2.

FIG. 2 is a vertical section taken along line 2—2 of FIG. 1 and showing the use of control valves to control the flow of fluids after their separation.

FIG. 3 is an enlarged fragmentary view of typical lateral openings in the coiled separation conduit, take from FIG. 1 to include line 4—4.

FIG. 4 is a section of one of the coils taken along line 4—4 of FIG. 1 or 3 showing typical lateral openings in the lower and outer walls of the separation conduit.

DESCRIPTION OF THE PREFERRED EMBODIMENT

As shown in FIG. 1, inlet connection 1 is attached to a first end 2, of coiled pipe separation conduit shown generally at 3, which has lateral openings 4 along the outer and lower wall 5 of conduit 3 as best shown in FIGS. 3 and 4. Typical openings as at 4 are spaced along the length of separation conduit 3 as may be necessary for the removal of fluid separated from the then remaining mixture, or lightest fluid. Normally, the spacing of openings increases in the direction of flow. Conduit 3 is formed with a decreasing radius of curvature 8, and/or a decreasing flow area 6 taken in the direction of flow 9, as may be required to increase the centrifugal force to a magnitude sufficient to cause the desired separation. Conduit 3 terminates as at 10 where it is joined to the light fluid outlet conduit 11 which in turn is attached to outlet connection 12, best shown in FIG. 2. The inner surface 40 of conduit 3 defines flow path 7.

Housing 13 encloses conduit 3 and is sealed around it as by welds 14 and 15 so as to maintain the desired pressure within housing 13 by means of a pressure control valve 16, well known in the art.

Housing 13 is provided with a lower outlet conduit 17 which terminates in outlet connection 18 which is in turn connected to control valve 19 also well known in the art. Control valve 19 is modulated by fluid level sensor-controlled 20, also well known in the art, to maintain fluid level 21 below openings 4 but above opening 27 of outlet conduit 17. Conduits 22 and 23 are connected to valves 16 and 19 to convey light and heavy fluids respectfully, to their destination.

FIG. 3 shows an enlarged fragmentary view of typical lateral opening 4 positioned with acute upstream angle 24, between its axis 25 and axis 26 of conduit 3 which allows: slow moving fluids to pass through openings 4 from flowpath 7 to chamber 28 defined by housing 13 and level 21; fast moving fluids to asperate through openings 4, from chamber 28 into flowpath 7, any light fluid that may be adjacent opening 4 and within chamber 28. That portion of surface 40 facing the center of rotation is surface 41 which acts to turn the flow in flowpath 7. Therefore, as denser fluids 42 separate from the mixture in flowpath 7, they impinge on surface 41 and flow by gravity to openings as at 4.

If it is desired to provide for removal of a medium density fluid from flowpath 7, conduit 29 is sealably attached to one or more ports 30 in conduit 3. Ports 30 are similar to ports 4 but are downstream relative to flowpath 7. The lower end of conduit 29 is sealably attached to the wall 31 of surge chamber 32, which in turn has lower outlet 33 connected to conduit 34 terminating at outlet 35, connected to control valve 36. Control valve 36 is modulated by fluid level sensor-controller 37, both well known in the art, to maintain fluid level 38 within surge chamber 32. Conduit 39 is connected to valve 36 to convey medium density fluid as desired. Depending on the availability of material forms and depending on the nature of fluids handled, other constructions may be employed without departing from the teaching of my invention.

OPERATION OF THE INVENTION

A pressurized mixture of at least two fluids of different densities are introduced through connection 1 into a first end 2 of separation conduit 3. As the mixture enters curved flowpath 7 of conduit 3, a beginning centrifugal force caused by the mild change of direction defined by the large initial radius of curvature 8, acts on the flowing mixture causing slugs and large droplets of denser fluid 42, to impinge against the inner surface 41 of conduit 3. The separated denser fluid 42 flows due to gravity, downwardly, through openings 4 to surface 21; out conduit 17; through valve 19 as allowed by fluid level sensor-controller 20; and thence through conduit 23 to the desired destination. As the denser fluid 42 moves outwardly to impinge on surface 41, it displaces the remaining mixture 43, inwardly to continue along curved path 7 of separation conduit 3. The remaining mixture 43 is subjected to a progressively increasingly centrifugal force caused by a decreasing curvature radius 8 of curved path 7 and/or a decreasing flow area 6, taken in the direction of flow 9, which causes separation of progressively lighter fluids, their impingement on surface 41 and their passage through ports as at 4 or 30. When a fluid of medium density is to be separated, conduits as at 29 deliver it to a separate destination via tank 32 as described above. When all other fluids have been separated from the lightest fluid, its passage across the next opening as at 4, in the direction of flow 9, acts to asperate from chamber 28, up through that opening any of the lightest fluid that may have been trapped in chamber 28 by earlier entrainment in heavy fluid.

Thus, complete separation to the extent desired is achieved by creating the required maximum centrifugal force on the mixture near the end of path 7. After the lightest fluid reaches exit conduit 11, it exits through outlet connection 12 as allowed by pressure control valve 16 which is adjusted to maintain the desired pressure in conduit 11.

This gradual but progressively increasing centrifugal force allows a gradual separation and removal of the denser fluids as the remaining mixture flows along path 7, thereby preventing: blockage of path 7 by too sudden a separation; excessive pressure drop across path 7; remixing of lighter and denser fluids due to blockage of path 7.

I claim:

1. A method of separating a first fluid from a pressurized mixture with a second fluid, said second fluid having a greater density than said first fluid, comprising: causing substantially all of said first fluid to travel a stationary first path of increasing centrifugal force through a zone of maximum centrifugal force; the first path comprising a confined, arcuate route of more than one revolution and having a decreasing radius in the direction of flow; the centrifugal force being sufficient to cause said second fluid to separate from said first fluid; causing the first fluid to exit the first path downstream from the zone of maximum centrifugal force; adjusting fluid flow along said first path responsive to pressure in said first path; adjusting said second fluid flow along said second path responsive to fluid level in said second path.

2. A method as defined by claim 1 further comprising: causing said first fluid to continue along the first path to a first exit conduit and causing the second fluid to travel a second path to a second exit conduit.

3. Means to separate a first fluid from a pressurized mixture with a second fluid, said second fluid having a greater density than said first fluid, comprising: means to cause substantially all of said first fluid to travel a stationary first path of increasing centrifugal force through a zone of maximum centrifugal force; the first path comprising a confined arcuate route of more than one revolution and having a decreasing radius in the direction of flow; said centrifugal force sufficient to cause said second fluid to separate from said first fluid; means to direct said second fluid from said first path and into a second path; means to cause the first fluid to exit the first path downstream from the zone of maximum centrifugal force; means responsive to fluid pressure in said first path and responsive to fluid level in said second path to adjust fluid flow along said first path and to adjust said second fluid flow along said second path.

4. Means as defined in claim 3 further comprising; means to exit said first fluid from said first path, means to exit said second fluid from said second path.

5. An apparatus to separate a first fluid from a pressurized mixture with a second fluid, said second fluid having a greater density than said first fluid, comprising: an inlet connection to receive said mixture; said inlet connection sealably attached to a first end of a stationary separation conduit; said separation conduit defining a first path of increasing centrifugal force; the first path comprising a confined arcuate route of more than one revolution and having a decreasing radius in the direction of flow through a zone of minimum radius; said centrifugal force sufficient to cause said second fluid to separate from said first fluid; a first exit connection sealably attached to a second end of said separation conduit downstream from the zone of minimum radius; said separation conduit being positioned such that substantially all of the first fluid flows through the first path; said first exit connection sufficient for removal of said first fluid; said separation conduit provided with one or more lateral openings into a second path to a second exit connection sufficient for removal of said second fluid; said lateral openings in said separation conduit sized, shaped and positioned so as to facilitate passage of said second fluid from said separation conduit to said second exit connection; means responsive to fluid pressure in said first path and responsive to fluid level in said second path to adjust fluid flow along said first path and to adjust said second fluid flow along said second path.

6. An apparatus as defined by claim 5, wherein: said lateral openings in said separation conduit are sized, shaped and positioned so as to facilitate passage of said first fluid through said separation conduit to said first exit connection.

7. An apparatus as defined by claim 5 wherein: said separation conduit has a decreasing radius of curvature in the direction of flow.

8. An apparatus as defined by claim 5 wherein: said separation conduit has a decreasing flow area in the direction of flow.

9. An apparatus as defined by claim 5 wherein said separation conduit has both a decreasing radius of curvature and a decreasing flow area in the direction of flow.

10. An apparatus as defined by claim 5 further comprising: a housing sealed around and enclosing said path of increasing centrifugal force; said housing receiving said second fluid through said lateral openings; said second exit connections sealably connected to the lower end of said housing.

11. An apparatus as defined by claim 5 wherein: said separation conduit is defined by a coiled pipe; said lateral openings being sealably connected to said second exit connection by a plurality of conduits.

12. An apparatus as defined by claim 5 wherein: said separation conduit is defined by a coiled pipe; one or more of said lateral openings being sealably connected to said second exit connection by one or more conduits; the remaining lateral openings being sealably connected to at least one additional exit connection so as to effect separation of at least a third fluid having a density greater than the first fluid but less than the second fluid.

* * * * *